US007667815B2

(12) United States Patent
Su

(10) Patent No.: US 7,667,815 B2
(45) Date of Patent: Feb. 23, 2010

(54) MULTI-PANEL MONITOR DISPLAYING SYSTEMS

(76) Inventor: Ming Su, 253 48th St., Lindenhurst, NY (US) 11757

( * ) Notice: Subject to any disclaimer, the term of this patent is extended or adjusted under 35 U.S.C. 154(b) by 911 days.

(21) Appl. No.: 10/927,043

(22) Filed: Aug. 27, 2004

(65) Prior Publication Data
US 2005/0057435 A1 Mar. 17, 2005

Related U.S. Application Data

(60) Provisional application No. 60/497,904, filed on Aug. 27, 2003.

(51) Int. Cl.
*G02F 1/1333* (2006.01)
(52) U.S. Cl. .............................. 349/187; 349/70; 349/73
(58) Field of Classification Search .................. 349/58, 349/61, 70, 73, 96, 149, 187; 445/24, 25; 345/1.3, 87
See application file for complete search history.

(56) References Cited
U.S. PATENT DOCUMENTS

| | | | | |
|---|---|---|---|---|
| 5,586,196 A * | 12/1996 | Sussman | ...................... | 382/114 |
| 5,768,093 A * | 6/1998 | Howell et al. | ................ | 361/680 |
| 5,851,411 A * | 12/1998 | An et al. | ........................ | 216/23 |
| 2001/0008303 A1* | 7/2001 | Nakamura | ................... | 257/666 |
| 2002/0003592 A1* | 1/2002 | Hett et al. | ....................... | 349/58 |
| 2002/0008809 A1* | 1/2002 | Babuka et al. | ................. | 349/73 |
| 2002/0036459 A1* | 3/2002 | Moon | ......................... | 313/495 |
| 2002/0080303 A1* | 6/2002 | Izumi | ........................... | 349/73 |
| 2002/0118321 A1* | 8/2002 | Ge | ............................... | 349/73 |
| 2003/0184706 A1* | 10/2003 | Watson | ........................ | 349/187 |
| 2004/0150581 A1* | 8/2004 | Westerinen et al. | ........... | 345/1.3 |

* cited by examiner

Primary Examiner—David Nelms
Assistant Examiner—Tai Duong
(74) Attorney, Agent, or Firm—IPFortune LLC; Ruay L. Ho

(57) ABSTRACT

A multi-panel monitor displaying system has a multi-panel monitor supported by one integrated Liquid Crystal Display Glass Module (LGM). The multi-panel monitor contains visually un-detective gaps between panels and, therefore, can provide viewers with high quality visual effect with low productive cost. A set of LGM technologies is utilized to re-design and integrate a plurality of LGMs. After integration, image rotation is also required by the multi-monitor displaying system to ensure perfect image displays.

9 Claims, 23 Drawing Sheets

Portal Type Photo of Multi-Panel Monitor  Gemini H156B 25.6 inch, Dual 15 inch LCD Panel Gap<20 mm, 8:3 Extra Wide Viewing Photo
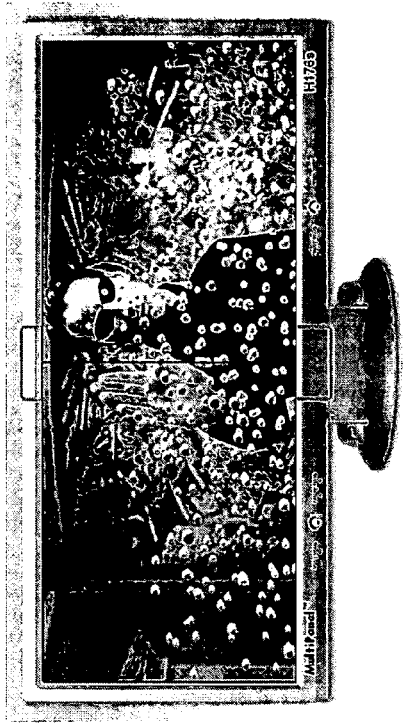
Gemini H176S
Gemini (dual panel) Serial
8:3 Extra Wide Viewing
H156S, Gap: 6mm, Resolution: 2048X768
H176S, Gap: 6mm, Resolution: 2560X1024
FIG. 3
Gemini H156S
Portal Type Horizontally and Vertically
Effect of Desktop Displaying
And Multi-Panel Wall Displaying 1101
Prior Art

1102

1104

1103

2 Pieces of integrated polarizer

4 Pieces of integrated polarizer

8 Pieces of integrated polarizer

Single Backlight Panel 2 pieces of Backlight Panels 4 pieces of Backlight Panels

1601

1602

1603

Straight CCFLs

1701

1702

1703

U-Shaped CCFLs

Gemini Serial Products

| Gemini V Serial ||||| 
|---|---|---|---|---|
| Mode | Panels | Diagonal | Ratio | Resolution |
| V14xx | 2x14" | 20.3" | 3:2 | 1536x1024 |
| V15xx | 2x15" | 21.6" | 3:2 | 1536x1024 |
| V17xx | 2x17" | 25" | 3:2 | 2048x1280 |
| Gemini VW Serial |||||
| VW17xx | 2x17" | 23.4" | 9:8 | 2560x1536 |
| VW22xx | 2x22" | 30.1" | 9:8 | 4800x3840 |
| Gemini H Serial |||||
| H14xx | 2x14" | 24" | 8:3 | 2048x768 |
| H15xx | 2x15" | 25.6" | 8:3 | 2048x768 |
| H17xx | 2x17" | 28.6" | 8:3 | 2560x1024 |
| H18xx | 2x18" | 30.4" | 8:3 | 2560x1024 |
| Gemini HW Serial |||||
| HW17xx | 2x17" | 31.3" | 32:9 | 2560x768 |
| HW22xx | 2x22" | 39.4" | 32:9 | 7680x2400 |
| Multipanel Q Serial |||||
| Q14xx | 4x14" | 28" | 4:3 | 2048x1536 |
| Q15xx | 4x15" | 30" | 4:3 | 2048x1536 |
| Q17xx | 4x17" | 34" | 4:3 | 2560x2048 |
| Q18xx | 4x18" | 36" | 4:3 | 2560x2048 |
| Multipanel QW Serial |||||
| QW17xx | 4x17" | 34" | 16:9 | 2560x1536 |
| QW22xx | 4x22" | 44.4" | 16:9 | 7680x4800 |

FIG. 22

MULTI-PANEL MONITOR DISPLAYING SYSTEMS

CROSS REFERENCE TO RELATED APPLICATIONS

The present application claims the benefit of U.S. provisional patent application No. 60/497,904 "Multi-Panel Monitor Displaying Systems," filed Aug. 27, 2003, the contents of which are hereby incorporated by reference.

FIELD OF THE INVENTION

The present invention is related to multi-panel monitor display systems. Particularly, the present invention is related to liquid crystal multi-panel monitor displaying systems.

BACKGROUND OF THE INVENTION

Liquid Crystal Display (LCD) system is the display system of the digital age. All major electronic displaying systems have switched from the traditional CRTs to LCDs, particularly, computer monitors and televisions. Once people switched from traditional CRTs to LCDs, it is unlikely for them to switch back to the traditional CRT displaying systems again. Hence, high quality LCD displaying systems are in demand. However, there are still some technical limitations on these LCD displaying systems, such as the number of pages can be reviewed simultaneously and how many features can be carried in the display area.

Most commercially available LCD products are single monitor displaying systems. FIG. 1 illustrates one single panel LCD monitor product, and two two-panel monitors. These products have an overall size ranged from 15 inches to 19 inches and a frame width ranged from 14.0 mm to 18.6 mm. Very too often an image is too large to be fully displayed on a single LCD monitor.

Hence, there are multi-monitor displaying systems available in the market providing multiple projector-based displays or video displays. These systems are assembled with a plurality of monitors having wide encircled frames. Some multi-monitor displaying systems can provide a better visual effect than the conventional single monitor displays by re-arranging these video displays in certain angles within a single housing unit. However, the gaps between monitors are still so big to be ignored and it interferes with viewer's enjoyment.

In addition, there are multi-panel displaying systems, also called multi-module displaying systems, available in the market. These displaying systems usually have wide gaps, also referred to as mullions, between panels. For example, a two-panel LCD product typically has an inch wide gap between the panels with a frame width of 13 mm. Despite of the wide gap, this type of multi-panel LCD is the best possible LCD displaying system available in the market. The large mullion between panels prevents the image display from having an integrated look and definitely gets in the way to interfere with the view effect.

Moreover, both the multi-monitor displaying systems and the multi-panel displaying systems are extremely costly. The high productive cost not only burdens the manufacturers but also decrease the enjoyable view effect of these systems. Therefore, reducing the production cost is equally important and challenging as reducing the gap between monitors for the next generation of multi-panel monitor displaying systems.

SUMMARY

Accordingly, the multi-panel monitor displaying systems of the present invention is developed to provide viewers with high quality of visual effect and substantially low production cost. The multi-panel monitor displaying systems of the present invention includes a multi-panel monitor of a plurality of panels and an integrated Liquid Crystal Display Glass Module (LGM) supporting the plurality of panels.

The integrated LGM consists of a plurality of Liquid Crystal Display Glass Modules (LGMs) and is achieved by utilizing a set of LGM technologies developed by the present invention. The LGM technology includes a set of technologies to re-design and manipulate LCD glass modules; they are the Multi-Join technology, the Cut Panel technology, the Backlight Panel technology, and the Polarizer technology.

The multi-panel monitor display systems of the present invention provide viewers the best viewing effect without any disadvantages of the conventional multi-monitor display systems and multi-module displaying systems. The display systems of the present invention have achieved the same enjoyable visual effect of the largest conventional LCD monitor, however, with extremely low production cost. Particularly, the multi-panel monitor displaying systems of the present invention can provide a greater width to length ratio and better visual effect. Most of all, the gaps between panels are visually un-detective. Specifically, the visually un-detective gap is less than or equal to 20 mm.

Several preferred embodiments of the present invention are illustrated herein for exemplary purposes. Referring to FIG. 2 and FIG. 3, three different preferred embodiments of the multi-panel monitor displaying systems, the Gemini H series, are shown with width and gap width. The Gemini H156 models have only a 6 mm gap and extensive multimedia capabilities, including brilliant colors and immaculate clarity. Gemini H series greatly expands your viewing area. This powerful 25.6-inch 8:3 multi-panel LCD monitor displaying system, as shown in FIG. 2, will redefine the way you do high-end photo, graphs, spreadsheets and drawings with a complete desktop multimedia presentation and video display in one exquisitely designed device. Various display effects are shown in FIG. 4 for a Gemini H156B model.

Furthermore, FIG. 5 illustrates other preferred embodiments of the multi-panel monitor displaying systems of the present invention. By utilizing the LGM and A/D board modifying technologies, a plurality of multi-panel monitor displaying models can offer viewer top quality of visual effect and with the lowest possible cost. Various details of the preferred embodiments of the present invention will be fully discussed in the following detailed description section.

DESCRIPTION OF DRAWINGS

FIG. 1 illustrates the LCD prior art, including one panel and two-panel displaying models.

FIG. 2 illustrates one of the preferred embodiments of the present invention, Gemini H156B.

FIG. 3: FIG. 3 illustrates two of the preferred embodiments of the present invention, Gemini H series.

FIG. 4 illustrates a sample of operation of a preferred embodiment of a multi-panel monitor displaying system.

FIG. 5 illustrates two preferred embodiments of the multi-panel monitor displaying systems of the present invention.

FIG. 6 illustrates comparison of the visual effect of a single monitor vs. multi-panel monitor of the present invention.

FIG. 7 illustrates some commercially available LCD panel modules employed in the present invention.

FIG. 8 illustrates the Multi-Join technology applied on two Type-I LGMs.

FIG. 9 illustrates the Multi-Join technology applied on one Type-I LGM and one Type-II LGM.

FIG. 10 illustrates the Multi-Join technology applied on two Type-I LGMs and two Type-II LGMs employed by the present invention.

FIG. 11 illustrates the application of Multi-Join technology applied on the Chip On Glass (COG), Type-III LGMs.

FIG. 12 illustrates the Polarizer technology developed by the present invention.

FIG. 13 illustrates the Polarizer technology developed by the present invention.

FIG. 14 illustrates the Backlight Panel developed by the present invention.

FIG. 15 illustrates the Backlight Panel technology applied on a preferred two-piece Backlight Panel model and a preferred four-piece Backlight Panel model.

FIG. 16 illustrates a Multi-Join method for Cold Cathode Fluorescent Lamps developed by the present invention.

FIG. 17 illustrates a Multi-Join method for Cold Cathode Fluorescent Lamps developed by the present invention.

FIG. 18 illustrates the side view of an integrated Multi-Panel Module of the present invention.

FIG. 19 illustrates the front view of an integrated Multi-Panel Module of the present invention.

FIG. 20 illustrates the back view of an integrated Multi-Panel Module of the present invention.

FIG. 21 illustrates a commercially available A/D board used in the present invention.

FIG. 22: FIG. 22 illustrates a table showing the data of one of the preferred embodiments of the present invention, the Gemini Serial Products.

FIG. 23 illustrates the ratios of the Gemini Serial Products.

DETAILED DESCRIPTION OF THE INVENTION

Figure 1:
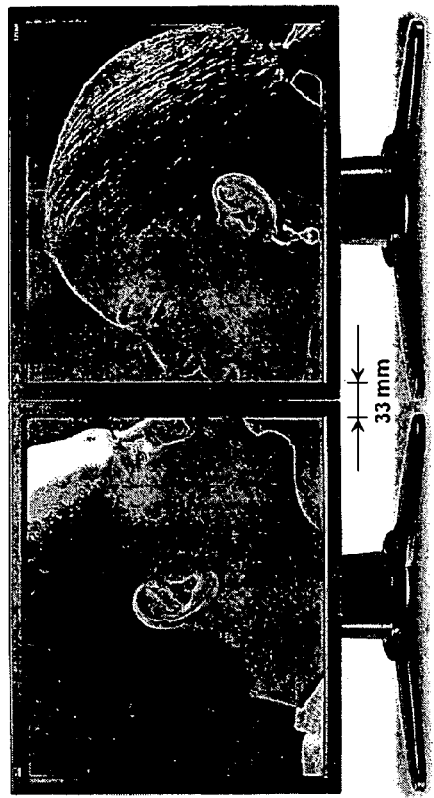
FIG. 1.
Figure 1:
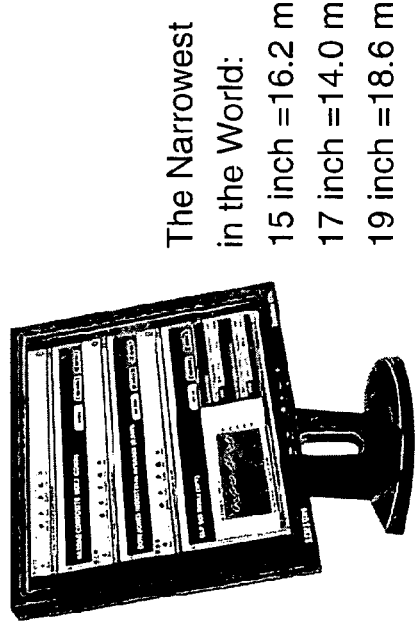
Figure 1:
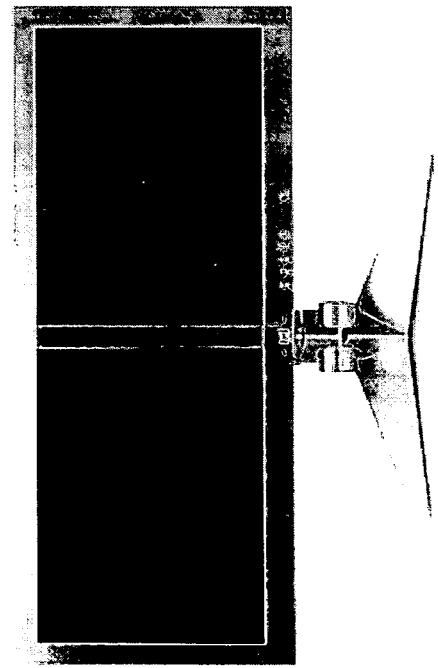
Figure 2:
FIG. 2.
Figure 4:
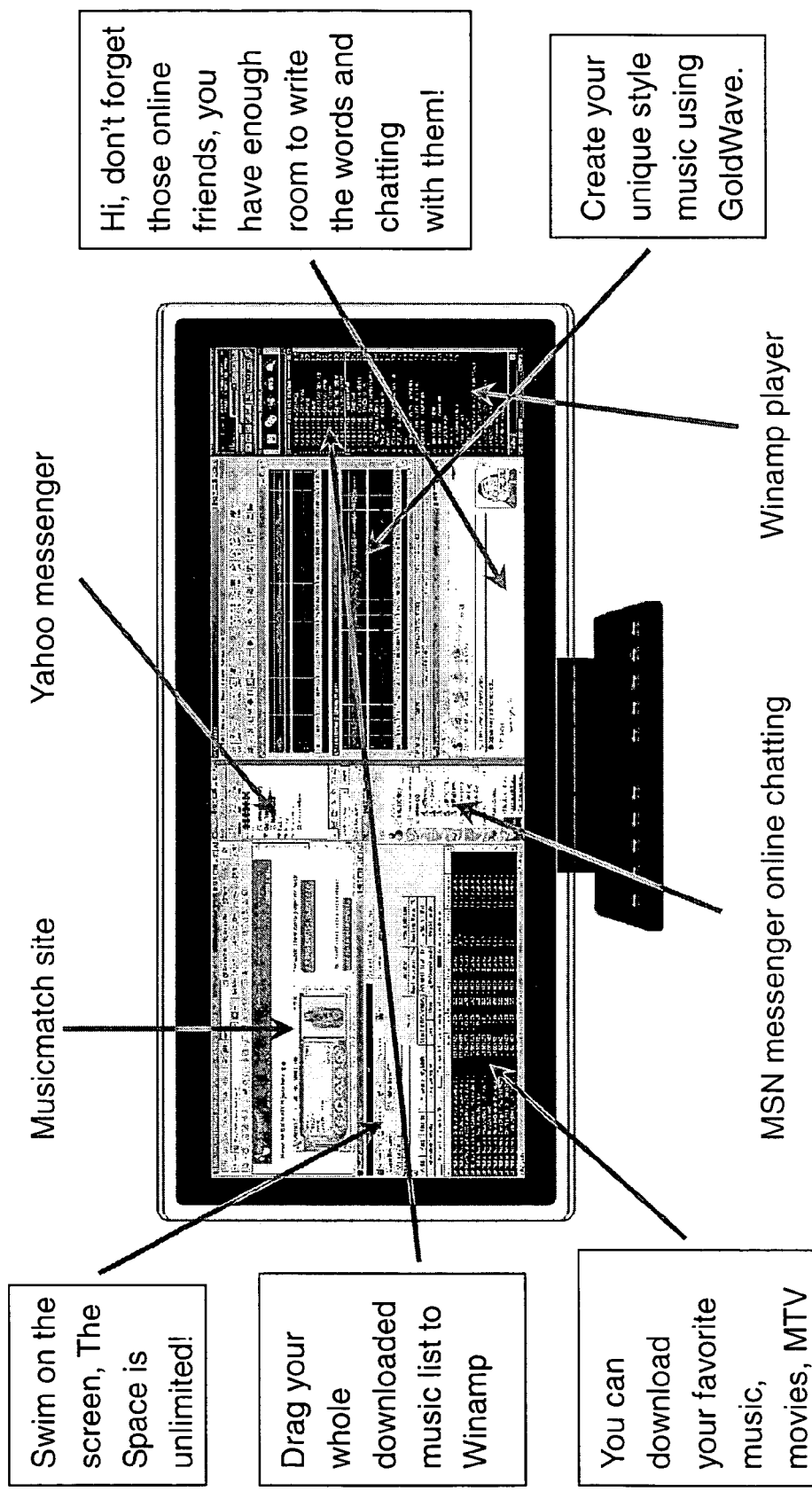
FIG. 4.
Figure 5:
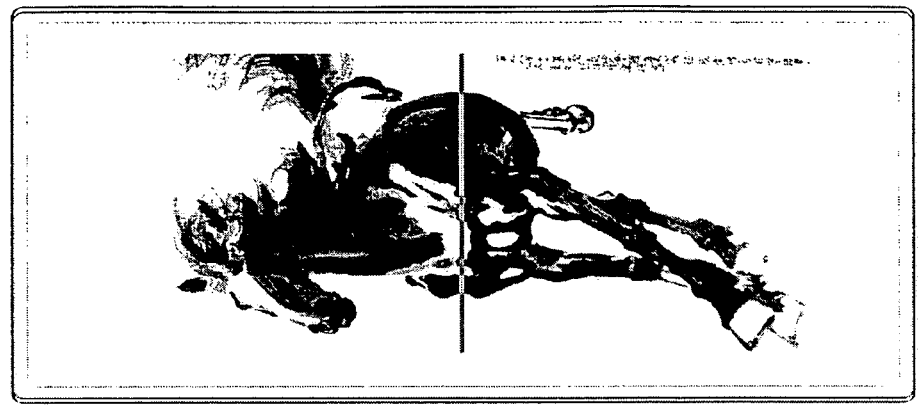
FIG. 5.
Figure 5:
Figure 5:
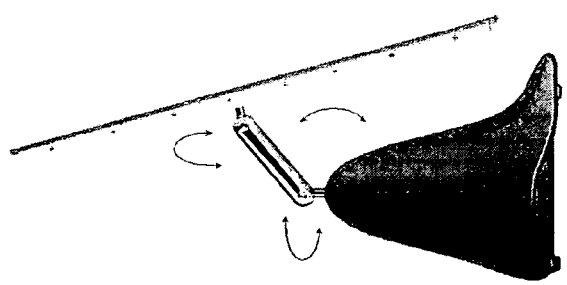

Liquid crystal display (LCD) system is the display system of the digital age. The present invention has made a breakthrough in LCD manufacturing technology by integrating a plurality of LGMs into one bigger and clearer displaying module, the multi-panel monitor displaying systems. The display systems can dissolve all the setbacks in the conventional LCD systems. A plurality of preferred embodiments of the present invention discussed herein. Some preferred embodiments of the present invention are shown in FIGS. 2, 3 and 5.

One preferred embodiment of the present invention is the Gemini H series. The picture-by-picture capability of Gemini H series with Extra-Wide panel enables you to view two input sources simultaneously at 2048×768 resolution. The Gemini H series also meet multimedia needs with direct interface capabilities for VCR, DVD, digital satellite receiver, camcorder and more. Connecting Gemini H with HDTV decoder or HDTV set-top box, you can enjoy HDTV too. With features like auto adjustment, color control, and image enhancement, there's no limit to what you can accomplish.

Figure 6:
FIG. 6.

In addition, whether you are executing finely detailed CAD/CAM and ACAD drawings or creating extensively layered graphics, the Gemini H series can deliver the most powerful performance that you deserve. Afterwards, you would not want to return to single panel monitor environment after experiencing the productivity and work-enabling advantage of the multi-panel monitor display systems of the present invention. FIG. 6 illustrates the visual effect of a single monitor display system versus a multi-panel monitor displaying system.

Figure 7:
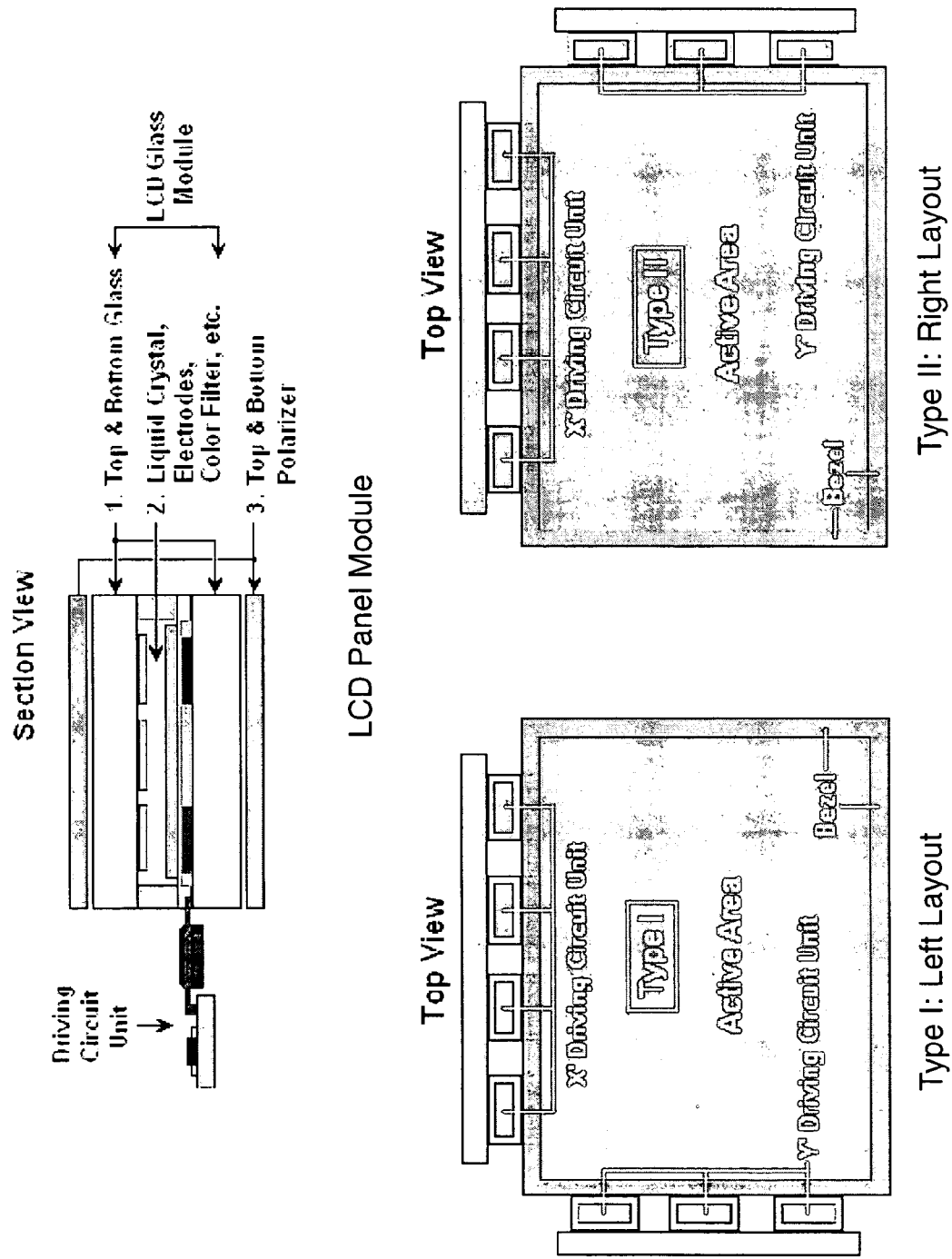
FIG. 7.

In order to achieve a top quality visual effect and a gap between LCD panels less than or equal to 20 mm, the present invention employs a Multi-Join technology, a Cut Panel technology, a Backlight Panel technology, and a Polarizer technology. Specifically, by utilizing these technologies on a set of commercially available LGM modules, as shown in FIG. 7, the present invention is able to integrate a plurality of LGM modules into one single LGM module. As a result, the present invention is able to offer top quality visual effect and lowest possible productive cost; most of all, achieving a gap that is less than or equal to 20 mm between LCD panels.

Multi-Join Technology

A Multi-Join Technology is used in the LGM integration process of the present invention. The LGM integration process is first arrange a plurality of LCD Glass Modules (LGMs) into a desired pattern, e.g., a joint of one Type-I LGM with a Type-II LGM, then, rotate one of some of the LGMs vertically or horizontally as needed. The Multi-Join technology, as illustrated in FIG. 8, is also utilized to encircle Cold Cathode Fluorescent Lamps (CCFLs) and Backlight Panels.

Afterwards, cut the correspondent bezels based on the desired pattern. For example, the commercially available Type-I and Type-II LGMs, the Type-I LGM can only be cut and joined at the right or bottom bezel because the right or bottom bezel does not have the driving circuit unit, and Type-II LGM can be cut on the left and bottom sides only. Referring to FIG. 7, the side view of a LCD Glass Module, the left side of the LGM is connected to a driving circuit. After the bezel cutting process, these LGMs are ready for joining. Now, join these LGMs either on the right side or on the bottom side of the LGMs. These LGMs then mature into an integrated LGM.

Figure 8:
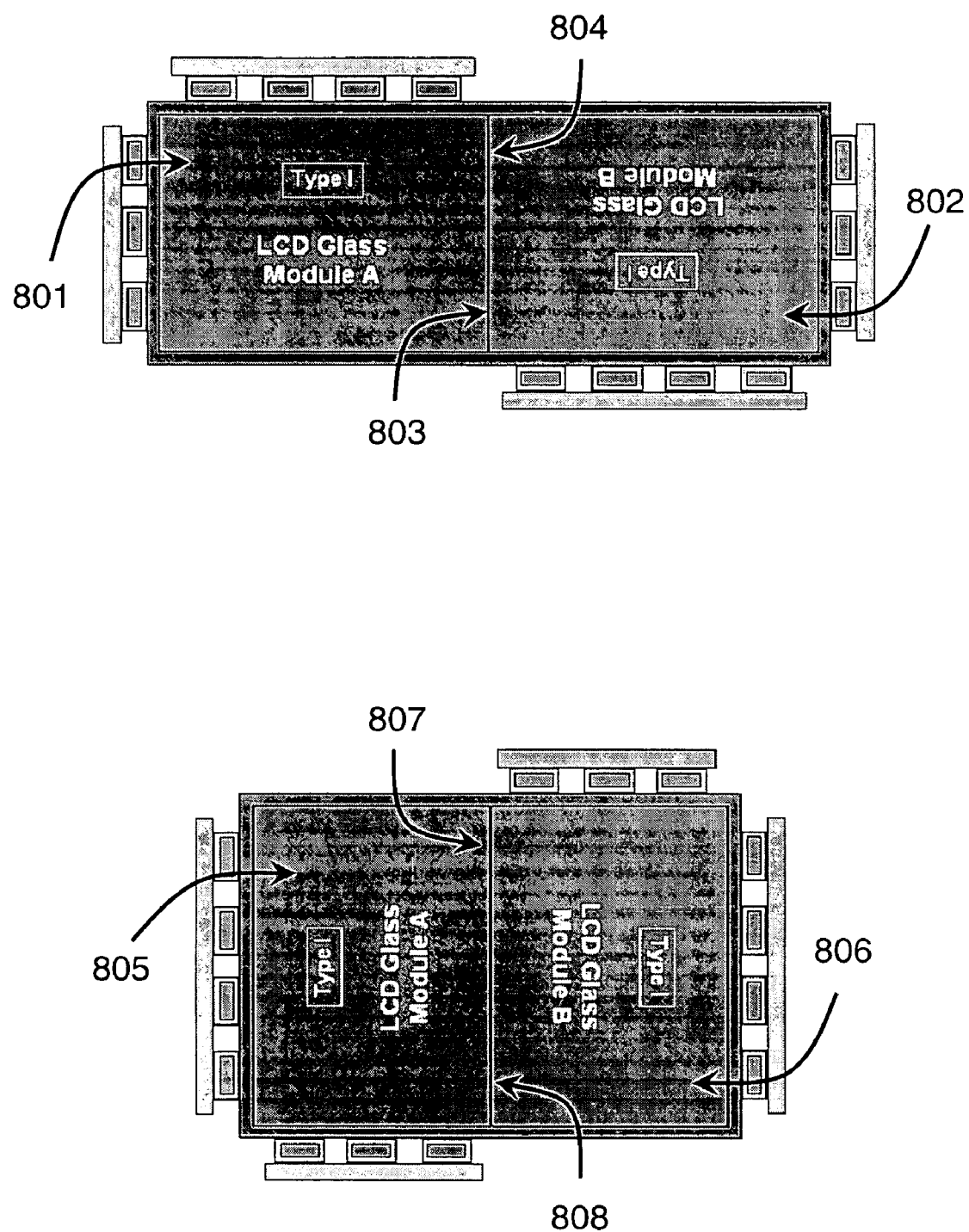
FIG. 8.

When joining two Type-I LGMs horizontally, referring to FIG. 8, first cut the right side bezels 803, 804 of LGM A 801 and LGM B 802 (i.e., Modules A and B) respectively, and rotate Module B 180° clockwise. Lastly, join the right side 803 of Module A 801 with the right side 804 of Module B 802 together. When joining two Type-II LGMs vertically, referring to FIG. 8, first cut the bottom side bezels 807, 808 of LGM A 805 and LGM B 806 respectively, then rotate Module A 90° counterclockwise and Module B 90° clockwise. At this point, both Module A 805 and Module B 806 are placed vertically. Finally, join Module A and Module B from their bottom sides 807, 808.

Subsequently, image rotation is required after the LGM integration process is completed. There are two ways to accomplish image rotation. The most convenient and economic way to rotate image for the multi-panel displaying systems of the present invention is utilizing a PC graphic card that supports multi-displaying image rotation. Viewers can invoke image rotation easily through a user-friendly graphical user interface; for example, activating the CONTROL PANEL then clicking on the DISPLAY and SETTING. Typically, the degree of image rotation and the designation of a particular panel can be specified.

Figure 21:
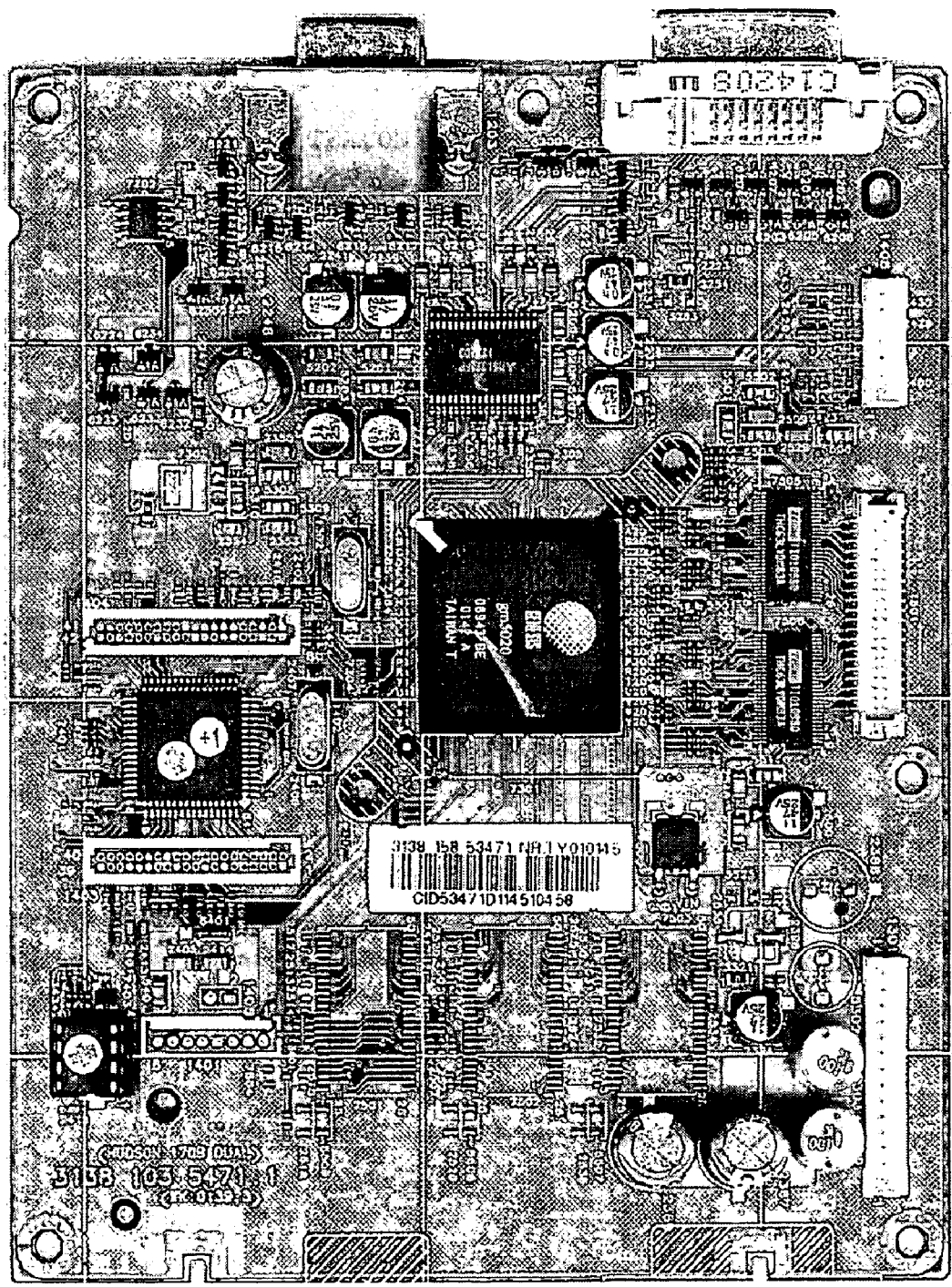
FIG. 21.

Another way to achieve image rotation is to employ a newly designed A/D board, which can be called "A/D Board 180". When coupled with an "A/D Board 180", the multi-panel monitor displaying systems of the present invention can do image rotation without PC graphic cards. A conventional A/D board is shown in FIG. 21. When the multi-panel monitor displaying systems of the present invention is coupled with a conventional A/D board, a PC graphic card is needed to achieve great image display. However, when a newly designed A/D Board 180 is coupled with the multi-panel monitor displaying systems of the present invention, great image displays come with the systems, no PC graphic card is necessary.

Figure 9:
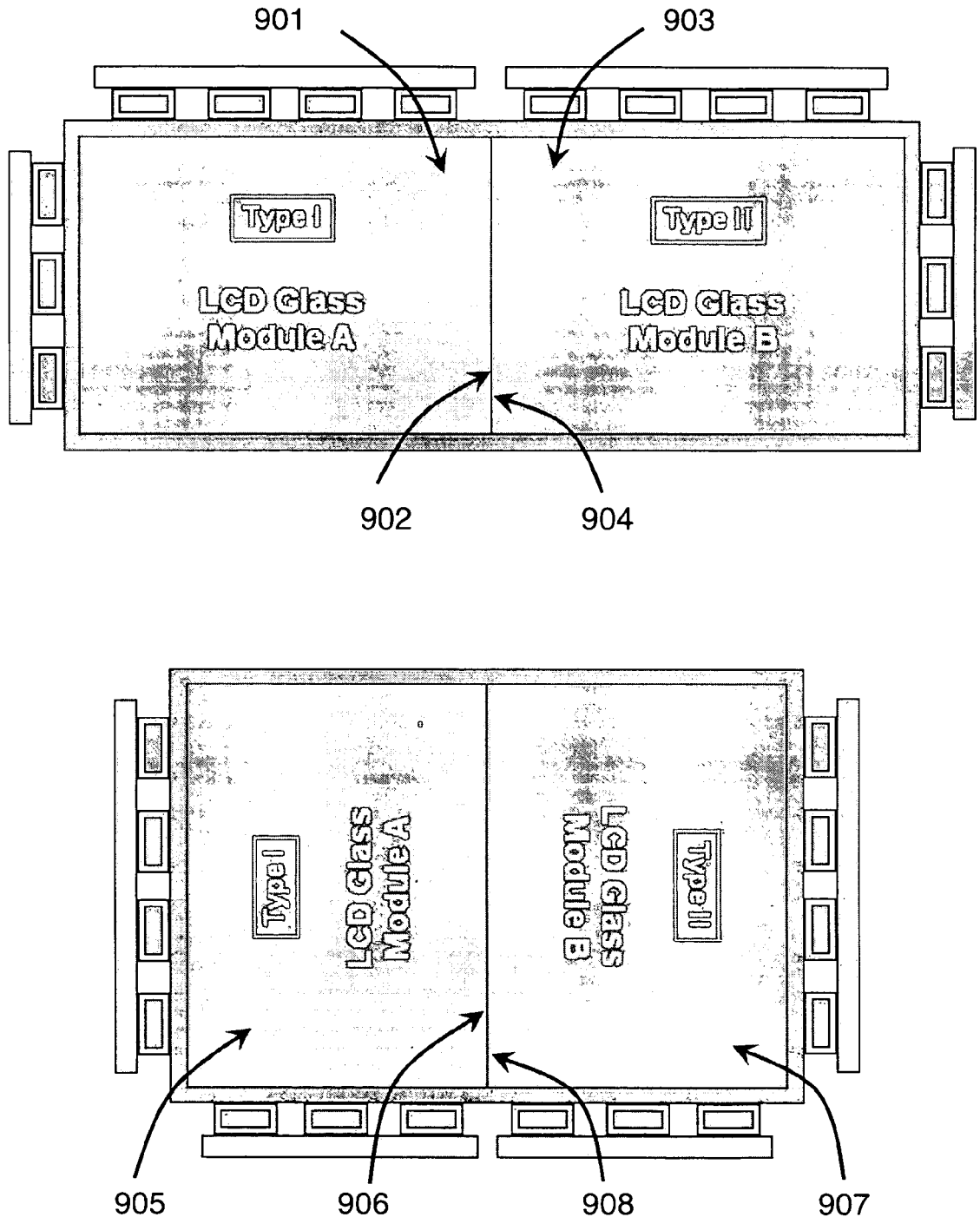
FIG. 9.

Furthermore, two Type-II LGMs can also be joined horizontally or vertically with a similar fashion as illustrated in FIG. 8. However, the joint is slightly different when it comes to join one Type-I LGM with one type-II LGM. Referring to FIG. 9 for the joint of one Type-I LGM (i.e., Module A) and one Type-II LGM (i.e., Module B) horizontally, first, cut the right side bezel 902 of Module A 901 and the left side bezel 904 of Module B 903. Then, join the right side 902 of Module A 901 with the left side 904 of Module B 903. Further, FIG. 9 illustrates the joint of one Type-I LGM (i.e., Module A) and one type-II LGM (i.e., Module B) vertically. First, cut the bottom side bezels 906, 908 of Module A 905 and Module B 907 respectively. Then, rotate Module A 90° counter clockwise and Module B 90° clockwise. Both Modules are now placed vertically. Finally, join Module A 905 and Module B 907 from their bottom sides 906, 908.

Figure 10:
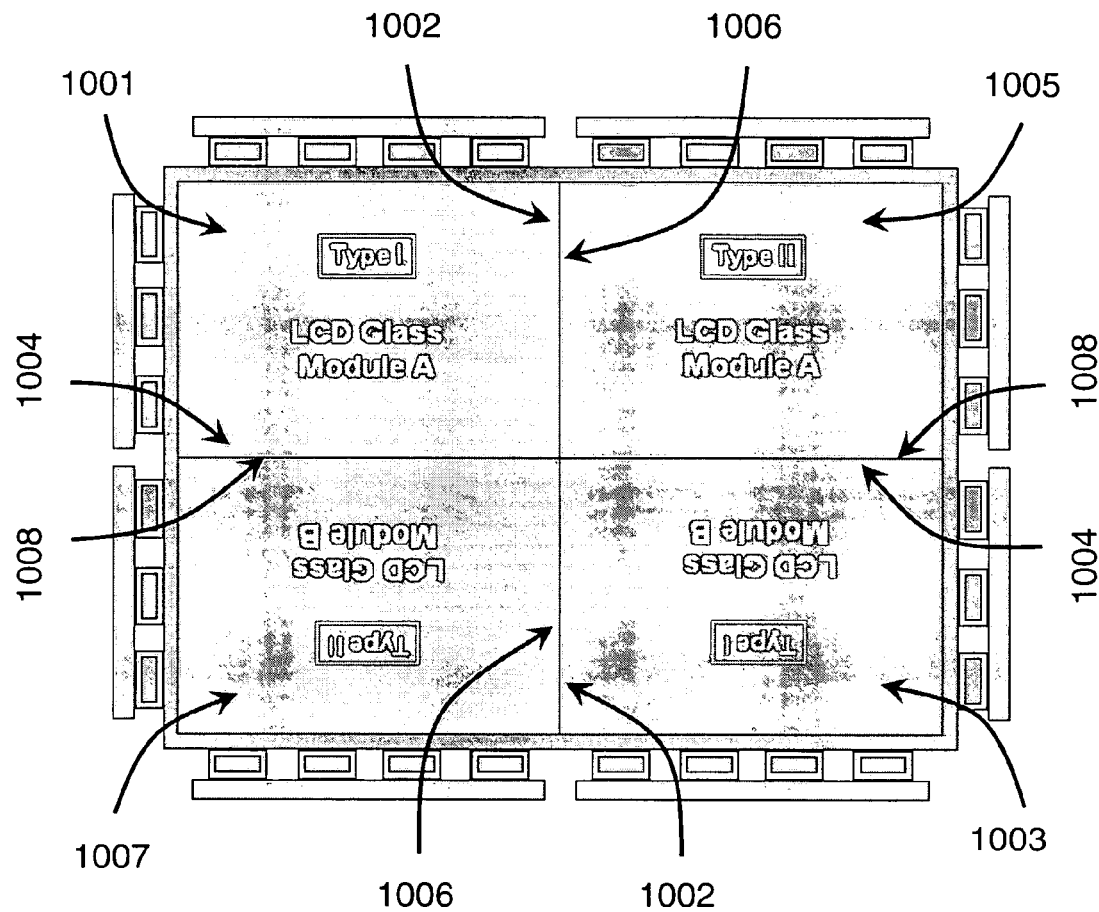
FIG. 10.

Now refer to FIG. 10 for the joint of two Type-I LGMs and two Type-II LGMs. For joining four mixed type LGMs, first, cut the right 1002 and bottom 1004 side bezels of Type-I LGMs (i.e., Module A 1001 and Module B 1003), and rotate Module B 180° counterclockwise. Then, cut the left 1006 and bottom 1008 side bezels of Type-II LGMs (i.e., Module A 1005 and Module B 1007), and rotate Module B 180° clockwise. Now, join the right side 1002 of Module A 1001 and the left side 1006 of Module A 1005 together horizontally; join Module A 1001 and Module B 1007 from their bottom sides 1004, 1008; join the right side 1002 of Module B 1003 with the left side 1006 of Module B 1007, and the bottom side 1004 of Module 1003 with the bottom side 1008 of Module A 1005.

Figure 11:
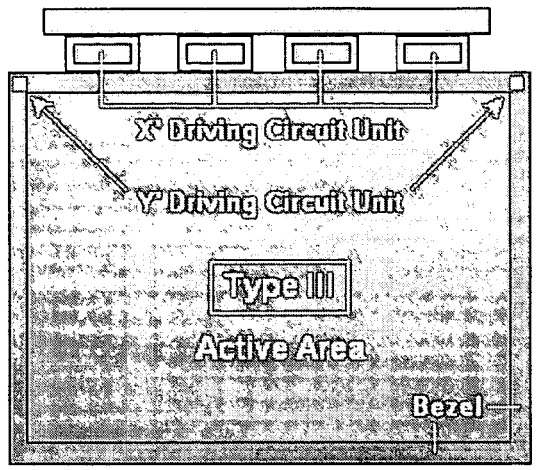
FIG. 11.
Figure 11:
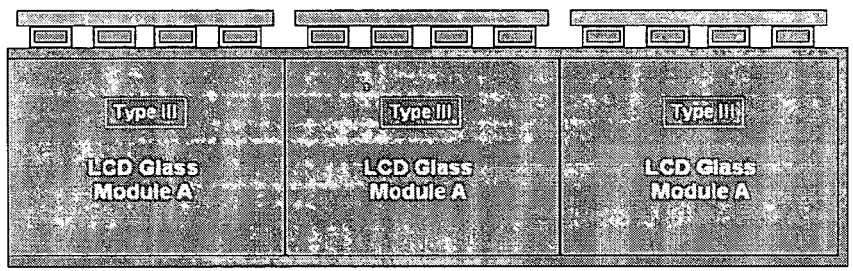
Figure 11:
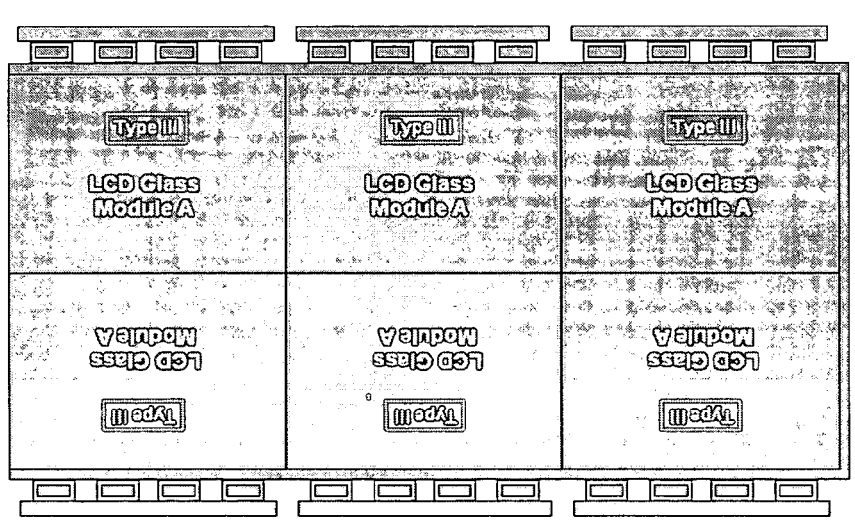

Furthermore, FIG. 11 illustrates another preferred embodiment of commercially available Type-III LGM, the single layout Chip On Glass (COG) 1101. This Type-III LGM has the control and driving circuit connected to one side bezel only. Therefore, all the technologies developed by the present invention, which are the Multi-Join technology, the Cut Panel technology, the Backlight Panel technology, and the Polarizer technology, can be applied to the right, left, and bottom bezels of this type LGM. Two exemplary patterns are shown in FIG. 11, the first pattern 1102 has three Type-III LGMs joined together horizontally, and in this particular pattern, no image rotation is required. The second pattern 1103 has six Type-III LGMs joined together horizontally and vertically. More importantly, this Type-III LGMs allows the patterns 1104 to be further joined by additional panels.

Based on the preferred embodiments given above, it should be obvious to those skilled in the art to apply the newly developed LGM technologies of the present invention to a plurality of LCD modules. Various layouts and models can be arranged according to individual manufacturing needs and market demands.

Cut Panel Technology

Coupled with Multi-Join technology is the cut panel technology. The cut panel technology is applied to the LCD Glass Module and not the polarizers. Therefore, the polarizers need to be taken off the LGMs first then put back to the LGMs after the LGMs have been cut. Frequently, the cut bezels of the LGMs require some polish work and the liquid crystal needs to be refilled and resealed to ensure a perfect visual effect.

Furthermore, the polarizers can be put back to the LGMs either after the LGMs have been cut or after the LGMs have been cut and rotated. Although there is an option for some models on whether to rotate polarizers along with the cut module, the displaying effect, however, is different. If the polarizers do not rotate with the cut module, the panel image display quality is somewhat lower than the display quality of a panel having polarizers rotated along with the module.

Polarizer Technology

Figure 12:
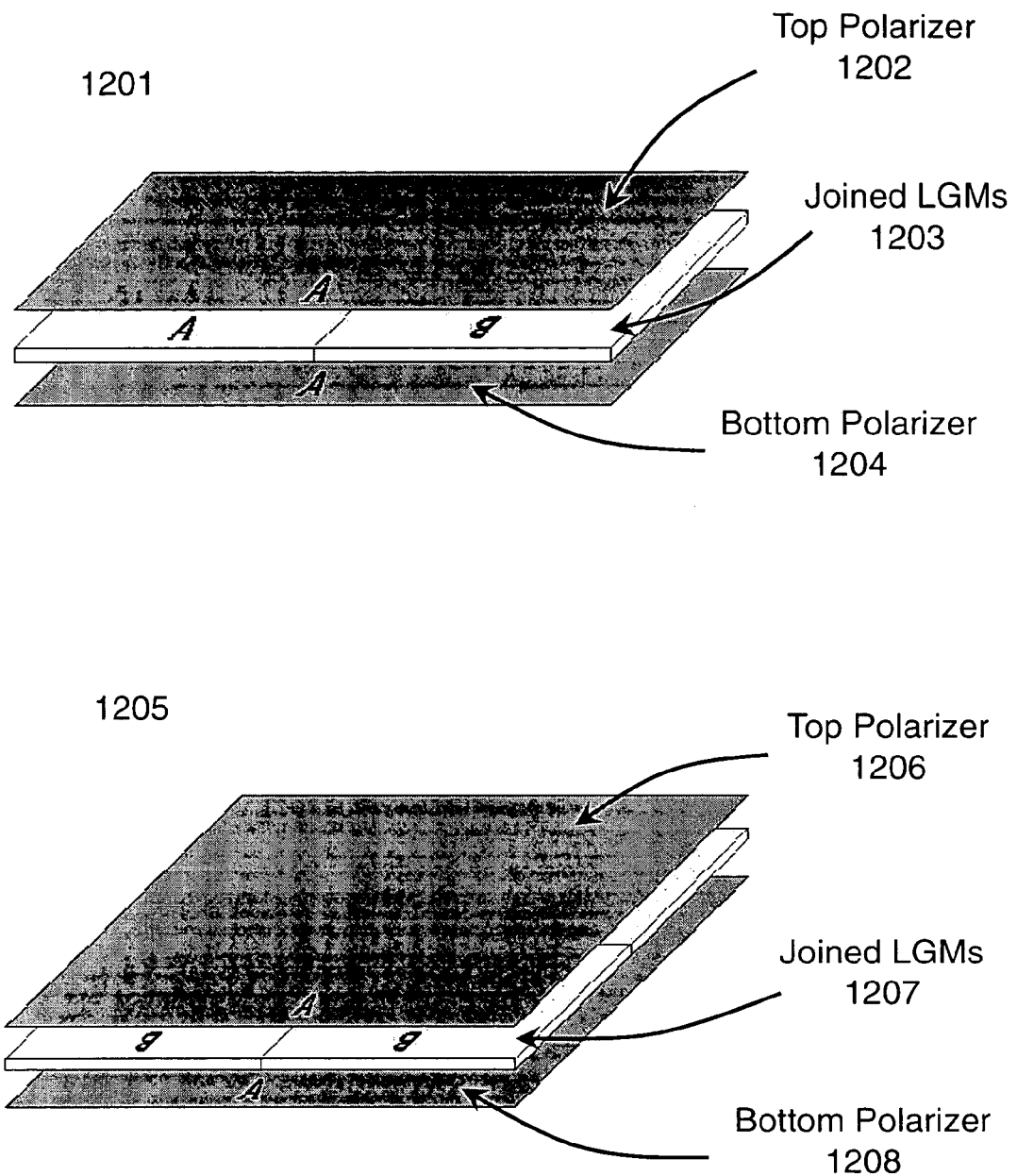
FIG. 12.

After joining and cutting the LGMs into a desired pattern, the Polarizer technology is utilized to integrate the joined LGMs into one LGM unit for the displaying systems of the present invention. There are two preferred embodiments of the present invention shown in FIG. 12. In FIG. 12, two preferred models of 2 pieces of integrated polarizes are illustrated. In both the rectangular 1201 and square 1205 shape models, the single polarizers face up. Two top polarizers 1202, 1206 attach to the top of the joined LGMs 1203, 1207 respectively and the bottom polarizes 1204, 1208 attach to the bottom of the jointed LGMs 1203, 1207 respectively.

Figure 13:
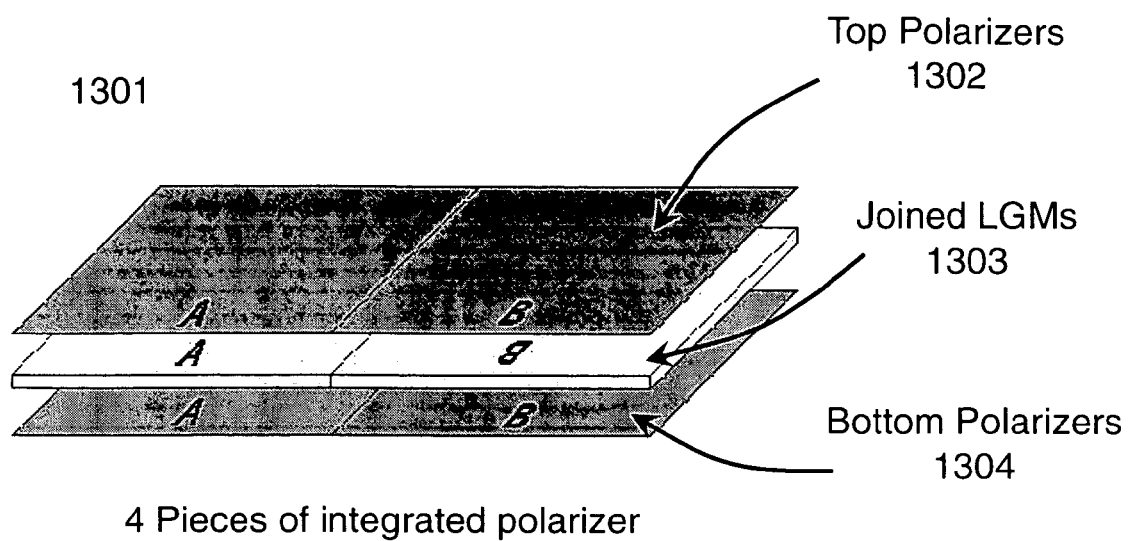
FIG. 13.
Figure 13:
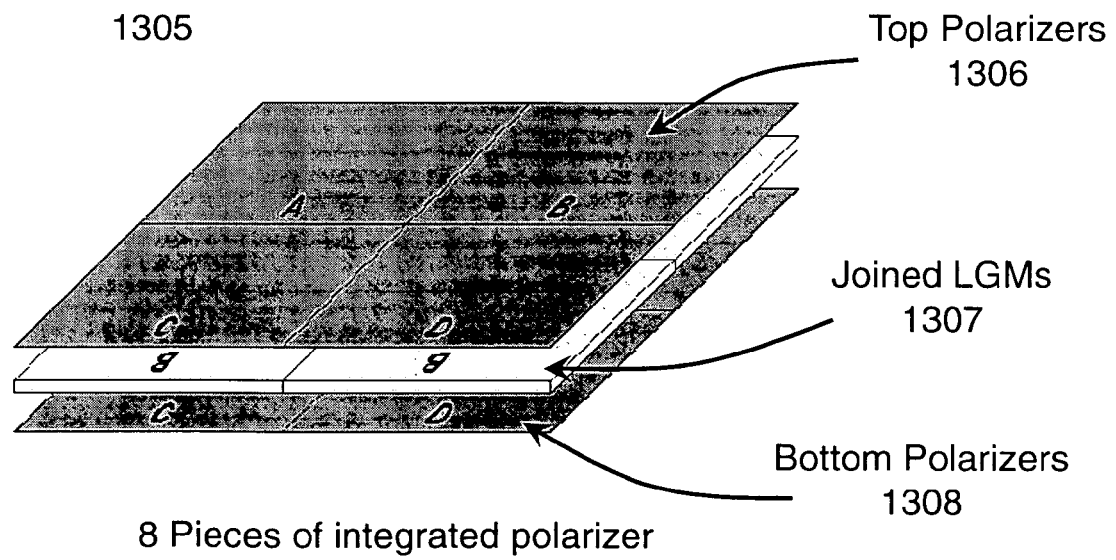

In addition, FIG. 13 shows a model of 4 pieces of polarizers 1301 and a model of 8 pieces of polarizers 1305. In FIG. 13, the two pieces of polarizers joined together horizontally becomes one set 1302, 1304; the four pieces of polarizers joined together horizontally and vertically become one set 1306, 1308. These sets of polarizers all face up. The top polarizer sets 1302, 1306 attach to the top of the joined LGMs 1303, 1307, and the bottom polarizer sets 1304, 1308 attach to the bottom of the joined LGMs 1303, 1307.

Backlight Panel Technology

Another important technology required for a top quality visual effect is the Backlight Panel technology. The backlight panel is used as the planar light source of the present invention. After joining a plurality of LGMs into one single LGM unit, the Backlight Panel technology is used to add a backlight panel that fits the integrated LGM unit to generate a further integrated LGM unit.

Figure 14:
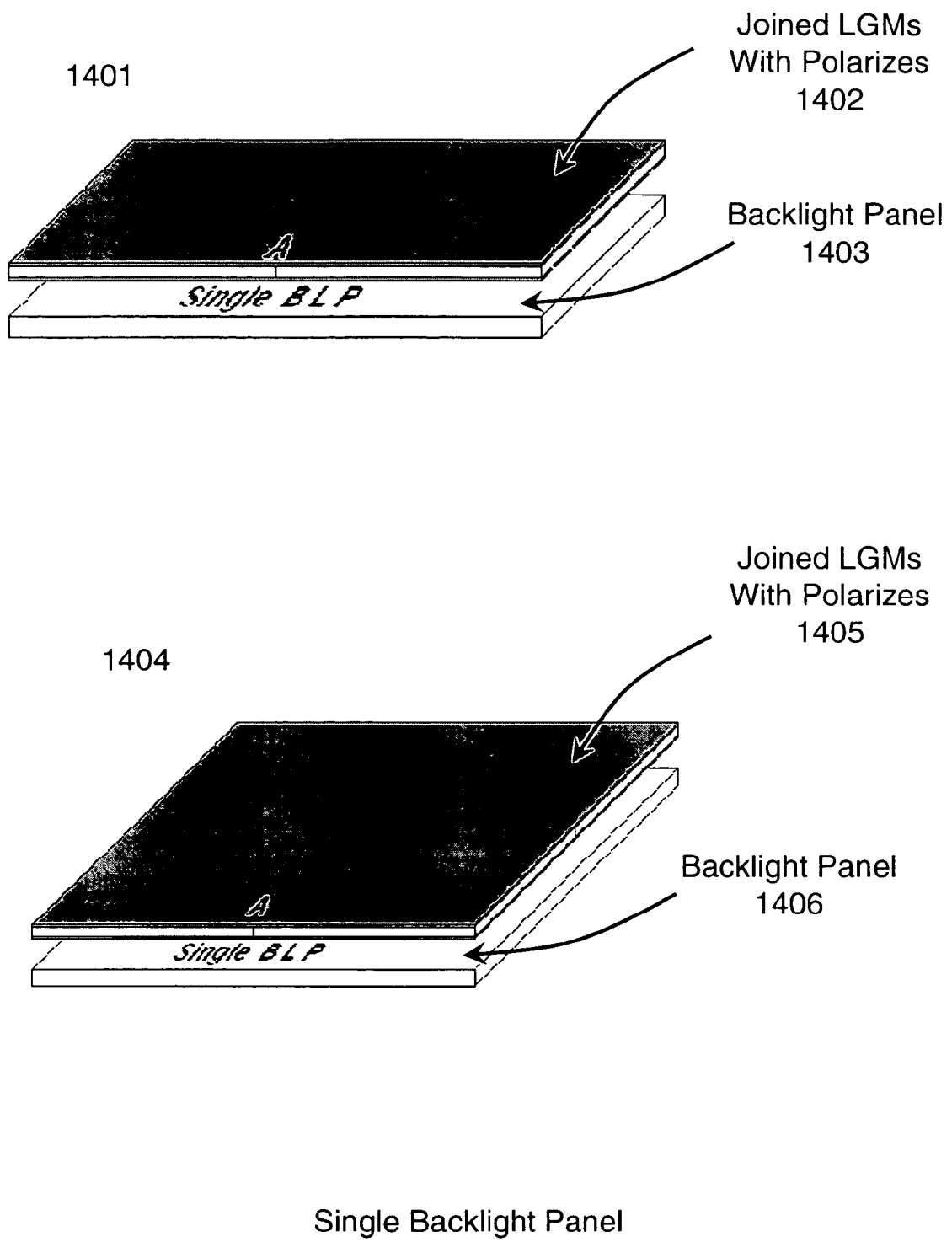
FIG. 14.

FIG. 14 is an illustration that shows some preferred Multi-Join methods for Backlight Panel technology. In FIG. 14, two Backlight Panel models 1401, 1404 are illustrated to demonstrate the Backlight Panel Technology. In these particular models, both the backlight panels 1403, 1406 face up and attach to the unit of the integrated LGMs and polarizers 1402, 1405.

Figure 15:
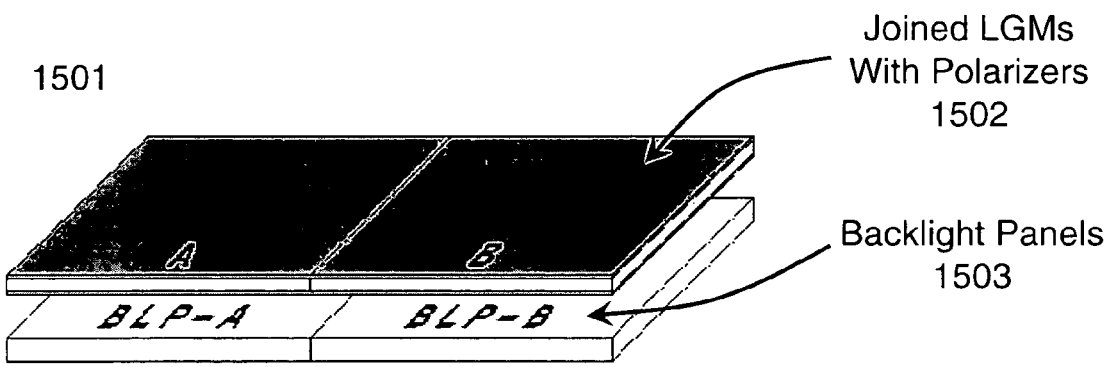
FIG. 15.
Figure 15:
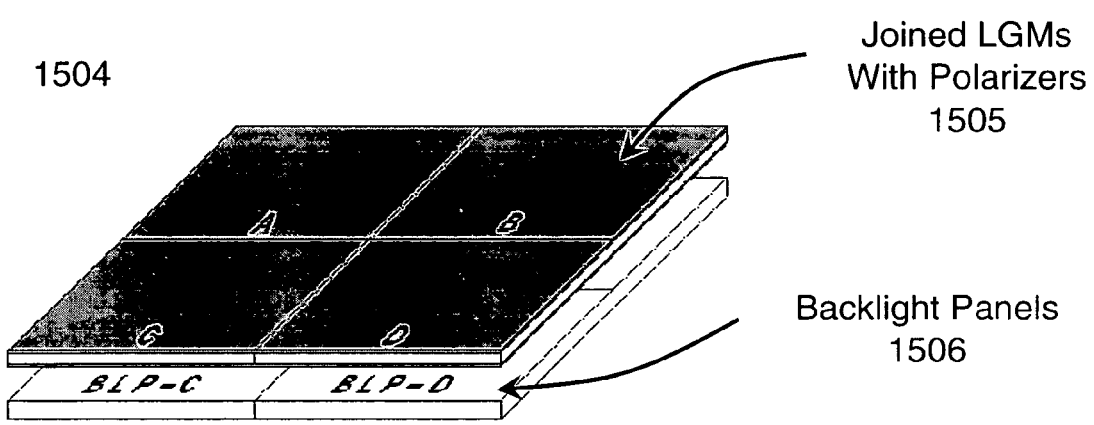

Now referring to FIG. 15 for a 2-piece backlight panel model 1501 and a 4-piece backlight panel model 1504. In the 2-piece backlight panel model, two pieces of backlight panels are joined together horizontally into one set of Backlight Panel (BLP) 1503. The BLP 1503 faces up and attaches to the joined LGMs with Polarizers 1502. In the 4-piece backlight panel model, four pieces of backlight panels are joined together horizontally and vertically into one set of BLP 1506. The BLP 1506 faces up and attaches to the unit of assembled LGMs and Polarizes 1506.

Multi-Join Methods for Cold Cathode Fluorescent Lamps (CCFLs)

Figure 16:
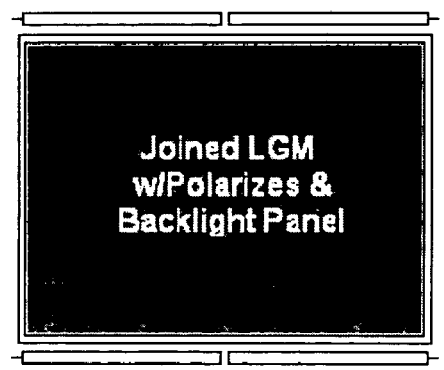
FIG. 16.
Figure 16:
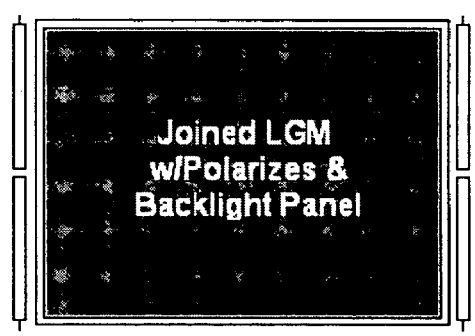
Figure 16:
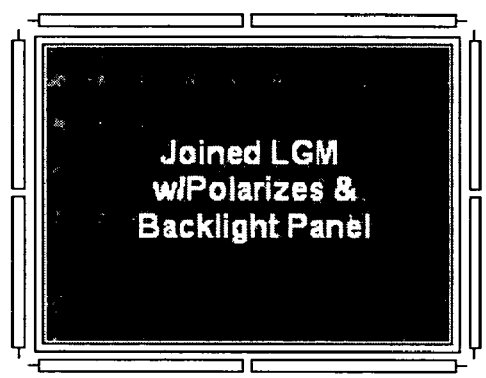
Figure 17:
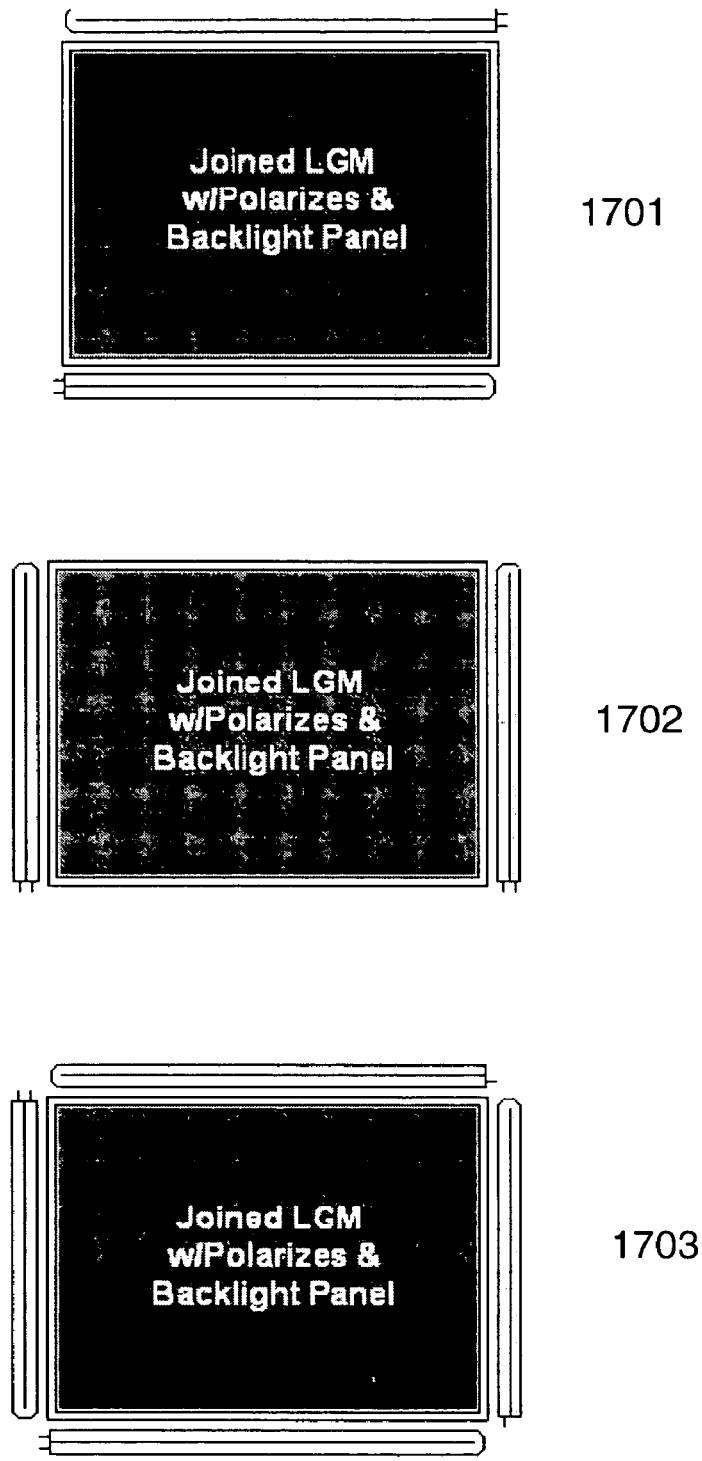
FIG. 17.

Finally, the Multi-Join method for Cold Cathode Fluorescent Lamps is used to hold the joined LGMs with polarizers and backlight panel together. FIGS. 16 and 17 show two preferred Multi-Join methods for CCFLs illustrating the basic application of Multi-Join methods for CCFL. Both the straight CCFL model and the U-Shaped CCFL model are utilized for the present invention.

FIG. 16 shows three straight CCFL layouts. In FIG. 16, the first layout 1601 shows four straight CCFLs are attached to a unit of integrated LGMs with polarizers and backlight panels horizontally. The second layout 1602 shows four straight CCFLs are attached to a unit of integrated LGMs with polarizers and backlight panels vertically. Lastly, the third layout 1603 shows a unit of integrated LGMs with polarizers and backlight panel is encircled by eight straight CCFLs.

Straight CCFLs have connectors at two ends and the middle section of a CCFL tends to be a bit darker than the rest of the CCFL. When connecting two straight CCFLs together, the connected area containing two CCFL connectors creates a dark section. As a result, a gap panels greater than 6 mm becomes inevitable.

Hence, in order to achieve a narrower gap between panels, the U-Shaped CCFL is used because the U-Shaped CCFLs do not have end connectors; thus, do not create a dark section at the connected area. Generally, the U-Shaped CCFLs application can provide displays with greater luminance and extremely slim gap.

FIG. 17 shows three U-Shaped CCFL layouts. In the first layout 1701, two U-Shaped CCFLs are attached to a unit of integrated LGMs with polarizers and backlight panels horizontally. In the second layout 1702, two U-Shaped CCFLs are attached to a unit of integrated LGMs with polarizers and backlight panels vertically. Lastly, in the third layout 1703, four U-Shaped CCFLs are attached to and encircles a unit of integrated LGMs with polarizers and backlight panels.

Structure Overview of a Multi-Panel LCD Monitor

Figure 18:
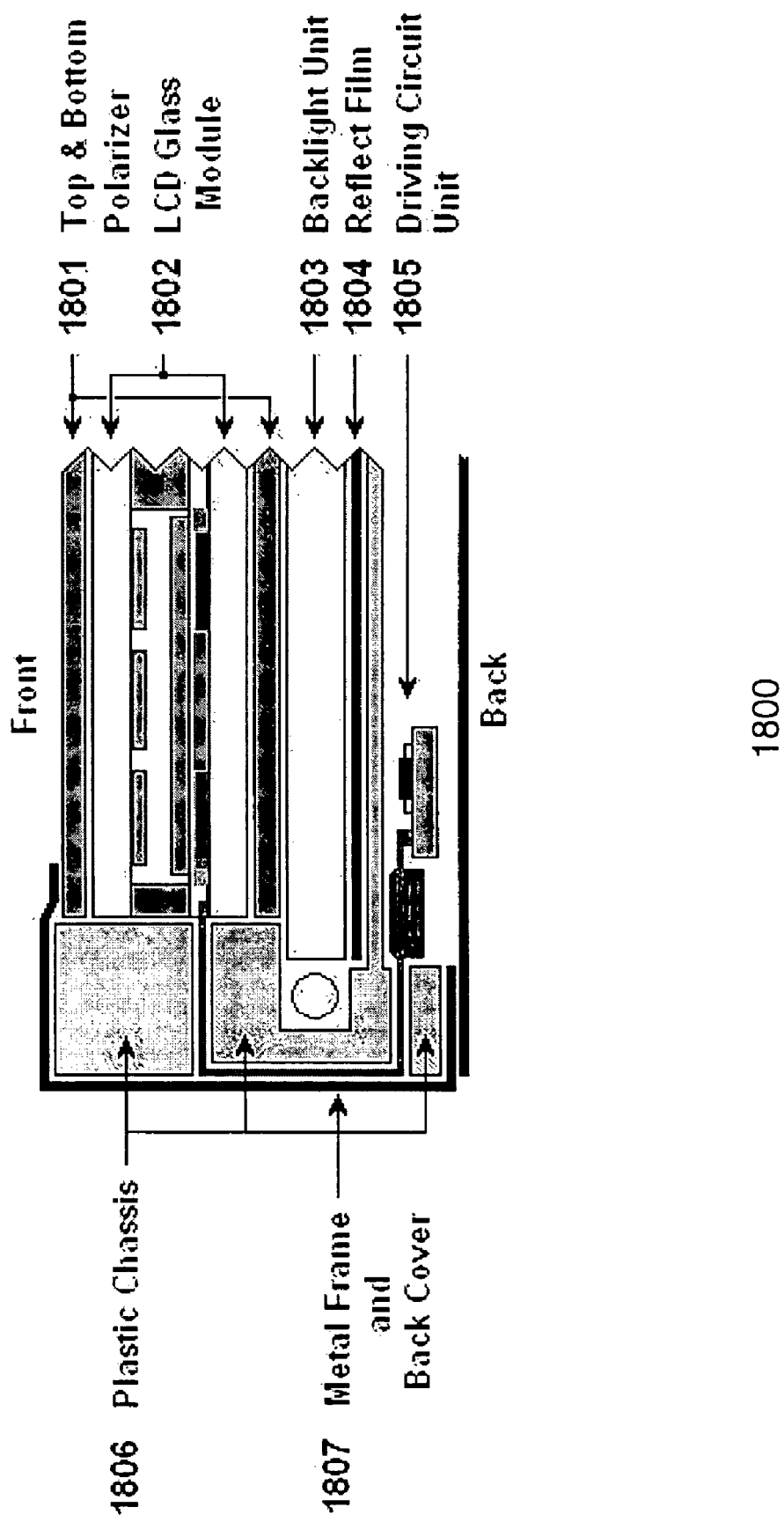
FIG. 18.

In FIG. 18, a detailed side view of a preferred embodiment of an assembled multi-panel module 1800 of the present invention is illustrated. This preferred assembled multi-panel module 1800 includes an integrated LGM unit that has a top and bottom polarizers 1801, and a LCD glass module 1802. This preferred module 1700 further includes a backlight unit 1803, three plastic chassis 1806, and a driving circuit unit 1805. The backlight unit 1803 has a reflect film 1804 attached to its back. The integrated LGM unit is placed on top of the backlight unit 1803 and together mounted on two plastic chassis 1806. The driving circuit unit 1805 and the third chassis 1806 under the backlight unit 1803 are held together with the integrated LGM unit and the backlight unit 1803 by a metal frame and back cover 1807 to secure the assembly.

Figure 19:
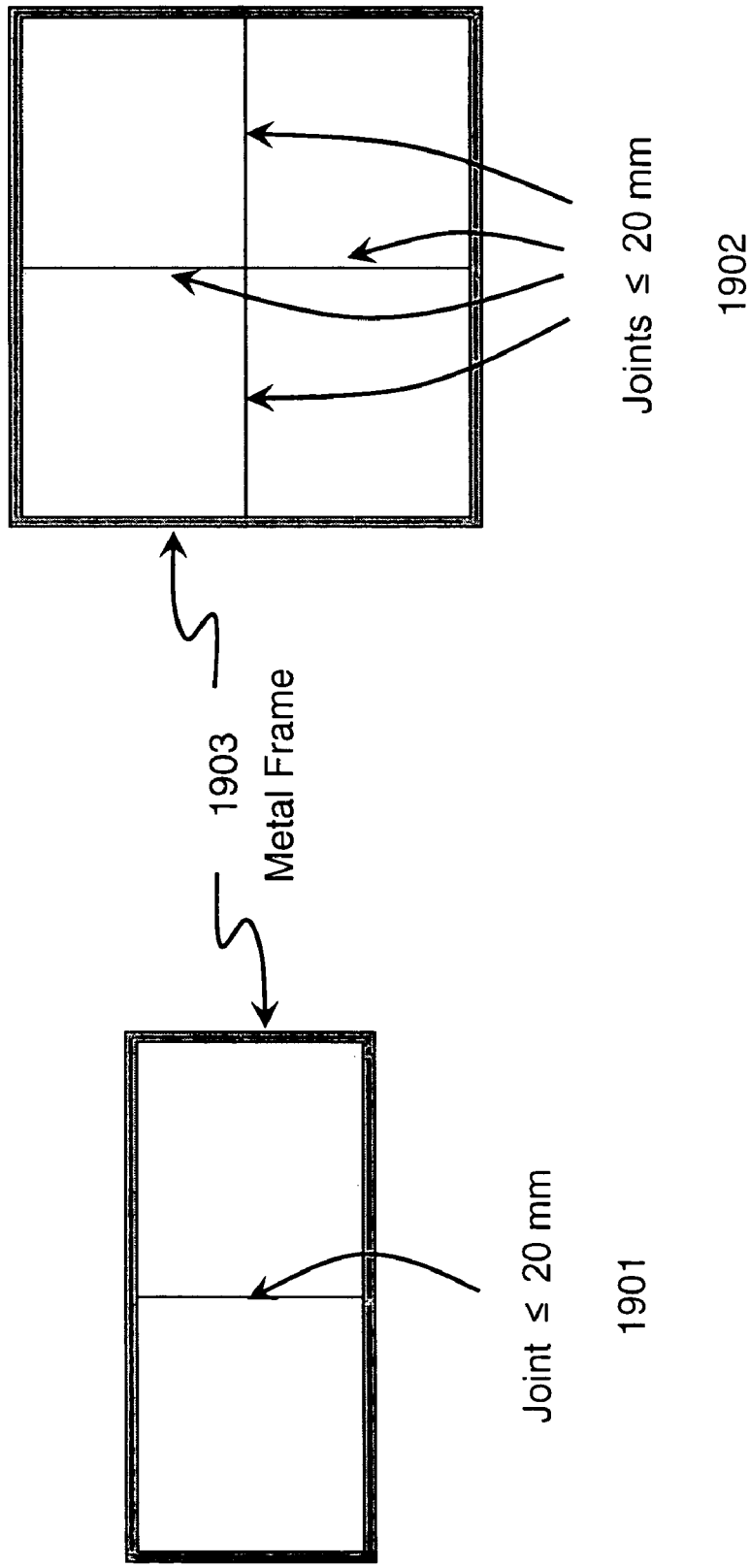
FIG. 19.
Figure 20:
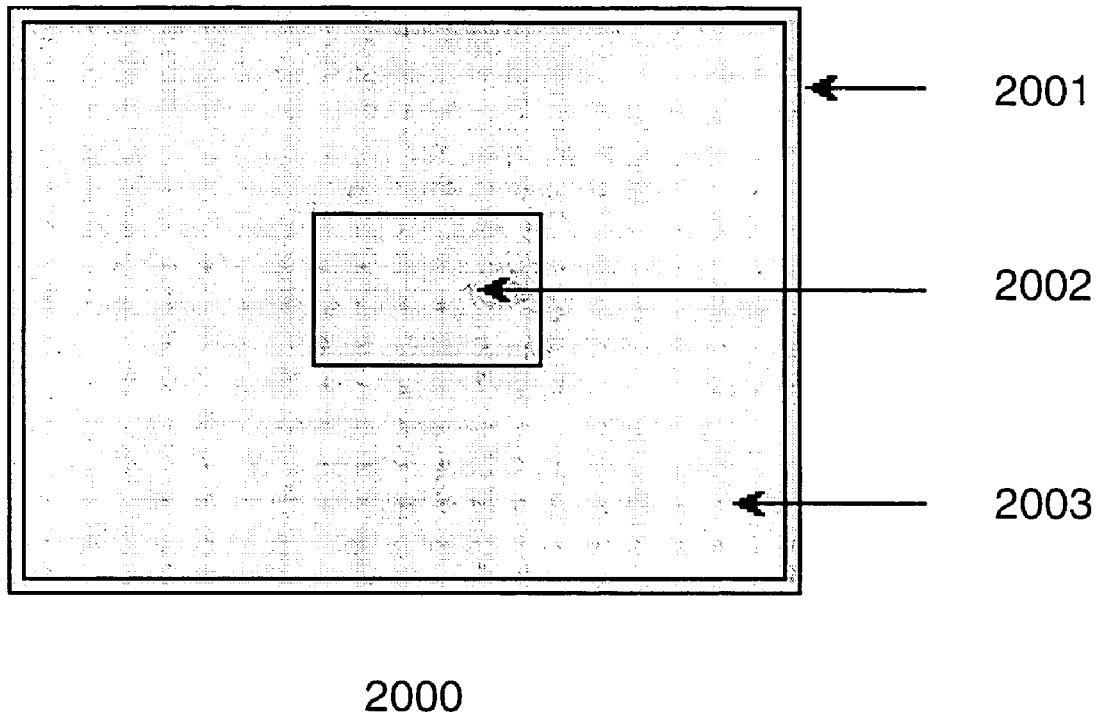
FIG. 20.

The front view of a preferred multi-panel module is shown in FIG. 19. In FIG. 19, both the rectangular module 1901 and the square module 1902 have a negligible gap less than or equal to 20 mm. The front view of the multi-panel modules also shows a metal frame 1903 in FIG. 19. In FIG. 20, the back view of a preferred multi-panel module 2000 is illustrated. The module 2000 includes a metal frame 2001, an A/D board and CCFL connectors 2002, and a back cover 2003.

Additionally, there are certain preferred accessories for the multi-panel monitor displaying systems of the present invention. They are power adapters, video cables, and some inner cables. There are also some other required and preferred accessories besides the assembled multi-panel modules 1700 and an A/D board, as shown in FIG. 21. They are an inverted board, a plastic shell, a metal chassis, a bracket, cables, connectors, an on screen display (OSD) keypad, and a stand.

An A/D board is illustrated in FIG. 21. This commercially available A/D board is utilized in the present invention. However, when a newly designed A/D board is utilized for image rotation, a PC graphic card that supports image rotation will be no longer required. Consequently, the multi-panel monitor displaying systems of the present invention can be used as a gigantic TV monitor or a video wall for special displays.

The Gemini Series

Figure 23:
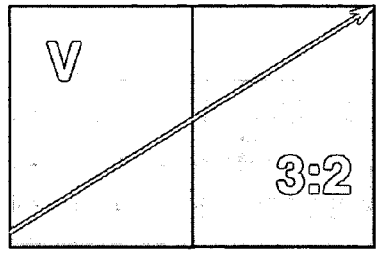
FIG. 23.
Figure 23:
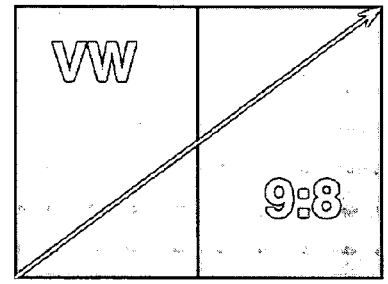
Figure 23:
Figure 23:
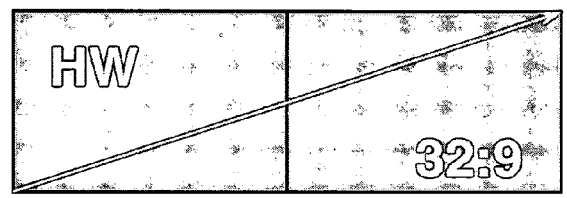
Figure 23:
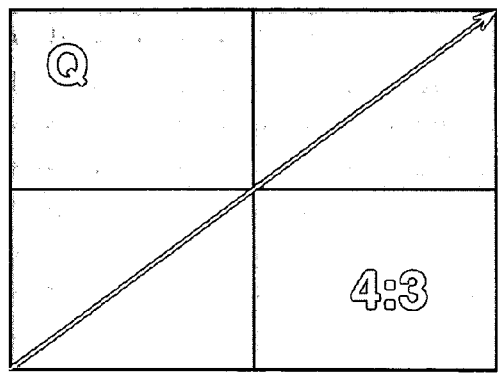
Figure 23:
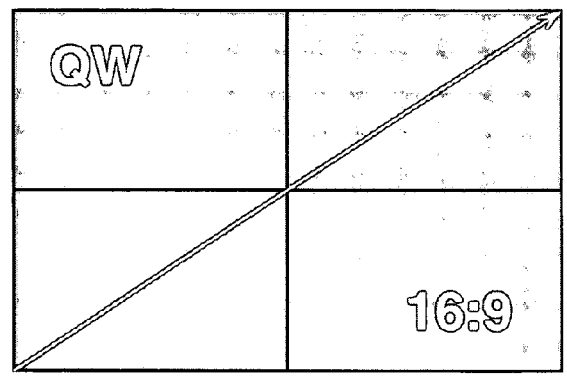

One of the preferred embodiments of the present invention is the Gemini Series. A table showing all the data of the Gemini Serial Products is given in FIG. 22, and FIG. 23 shows the ratios of the Gemini Serial Products. The Gemini H156B, as shown in FIG. 3, flat panel display (TFT) is 25.6 inches. This model weighs only 9.8 pounds with dimensions (W×D×H) of 26 inches×5.5 inches×13 inches and a diagonal size of 25.6 inches. Another preferred embodiment is also shown in FIG. 2, the Gemini H series. The Gemini H model has a 24 inches overall size monitor and an 8:3 length to width ratio.

The gap between panels of Gemini H156B is only 6mm, and a view of 8:3 extra-wide. The Dot Pitch is 0.29 mm, and the maximum resolution can be at 2048×768. The color support of Gemini H156B is 24 bits, that is, 16.7 Mega colors. With all these high standard specifications, the operational power consumption is only 35 watt. Compliant standards include but not limited to Plug and Play, CE, CSA, TUV, VCCI, C-Tick, GOST, CCIB, DDC-1, DDC-28, IEC950, MEEI, NEMKO, SEMKO, SIQ, TCO '95, UL 1950, VDE.

The Gemini H series also includes other models that have unit dimensions from 2×14 inches to 2×18 inches. For example, the Gemini H156S Monitor can be used as one panel display system or a multi-panel display system. The product size ranges from 24 inches to 30.4 inches, a length to width ratio of 8:3, and resolutions from 2048×768 to 2560×1024.

There are also Gemini V series and Gemini Q series products. The Gemini V series have unit size from 2×15 inches to 2×17 inches and product size from 20.3 inches to 25 inches. With a length to width ratio of 6:4, the Gemini DP series have resolutions from 1536×1024 to 2048×1280. The Gemini Q series have unit size from 4×14 inches to 4×18 inches and product size from 28 inches to 36 inches. With a length to width ratio of 4:3, the Gemini Q series have resolutions from 2048×1536 to 2560×2048.

Accordingly, the present invention provides multi-panel monitor displaying systems for displaying images on multi-panel LCD screens. Although the present invention has been described in certain preferred embodiments, many modifications and variations would be apparent to those skilled in the art. It is therefore understood that the present invention may be practiced otherwise than as specifically described herein. Hence, those preferred embodiments described in the present invention should be considered in all respects as illustrative and not restrictive.

I claim:

1. A method of making a multi-panel monitor for image display comprising:
   cutting a first correspondent bezel of a Liquid Crystal Display Glass Module (LGM) of a plurality of Liquid Crystal Display Glass Modules (LGMs) in a desired pattern;
   attaching polarizers to the LGM with the cut bezel;
   multi-joining the plurality of LGMs together into a large integrated LGM; and
   joining the large integrated LGM with a backlight mechanism.

2. The method of claim 1 wherein the desired pattern is arranging a plurality of Liquid Crystal Display Glass Modules (LGMs) into a layout for the multi-joining.

3. The method of claim 2 further comprising cutting a second correspondent bezel of a Liquid Crystal Display Glass Module (LGM).

4. The method of claim 3 further comprising cutting a third correspondent bezel of a Liquid Crystal Display Glass Module (LGM).

5. The method of claim 1 wherein the large integrated LGM further comprising a gap between the plurality of LGMs less than or equal to 20 mm.

6. The method of claim 1 wherein the backlight mechanism further comprising a plurality of straight Cold Cathode Fluorescent Lamps (CCFLs).

7. The method of claim 1 wherein the backlight mechanism further comprising a plurality of U-Shaped Cold Cathode Fluorescent Lamps (CCFLs).

8. The method of claim 1 wherein the backlight mechanism further comprising a plurality of backlight panel.

9. The method of claim 1 wherein the large integrated LGM further comprising coupling with a PC graphic card for image rotation.

* * * * *